(12) United States Patent
Kelliher et al.

(10) Patent No.: US 7,693,564 B2
(45) Date of Patent: Apr. 6, 2010

(54) SYSTEM, APPARATUS AND METHOD FOR FORENSIC FACIAL APPROXIMATION

(75) Inventors: Timothy Patrick Kelliher, Scotia, NY (US); Peter Henry Tu, Schenectady, NY (US); Wesley David Turner, Rexford, NY (US); Rebecca Erin Biewer Brown, Clifton Park, NY (US); Michael Alan Taister, Oakton, VA (US); Kevin William Peter Miller, Washington, DC (US)

(73) Assignee: General Electric Company, Niskayuna, NY (US)

( * ) Notice: Subject to any disclaimer, the term of this patent is extended or adjusted under 35 U.S.C. 154(b) by 729 days.

(21) Appl. No.: 10/992,433

(22) Filed: Nov. 19, 2004

(65) Prior Publication Data

US 2006/0111631 A1 May 25, 2006

(51) Int. Cl.
*A61B 5/05* (2006.01)
(52) U.S. Cl. .................. 600/407; 382/131; 382/128
(58) Field of Classification Search ................ 600/410, 600/407; 382/128, 131
See application file for complete search history.

(56) References Cited

U.S. PATENT DOCUMENTS

| | | | | |
|---|---|---|---|---|
| 5,214,686 A | * | 5/1993 | Webber | 378/38 |
| 5,813,984 A | * | 9/1998 | Haaga et al. | 600/410 |
| 5,844,573 A | * | 12/1998 | Poggio et al. | 345/441 |
| 2003/0074172 A1 | * | 4/2003 | Ortiz et al. | 703/11 |
| 2003/0226266 A1 | * | 12/2003 | Ellis | 33/17 R |
| 2004/0236229 A1 | * | 11/2004 | Freeman et al. | 600/474 |
| 2005/0033142 A1 | * | 2/2005 | Madden et al. | 600/407 |
| 2007/0038331 A1 | * | 2/2007 | Hanson | 700/245 |
| 2007/0052726 A1 | * | 3/2007 | Wright et al. | 345/629 |

OTHER PUBLICATIONS

"A Survey of Tissue Depth and Landmarks for Facial Approximation"—Kevin W.P. Miller et al. pp. 1-25, Forensic Science Communications, vol. 6. No. 1, Jan. 2004.

* cited by examiner

*Primary Examiner*—Eric F Winakur
*Assistant Examiner*—Helen Bor
(74) *Attorney, Agent, or Firm*—Patrick K. Patnode (57) ABSTRACT

A system, method and apparatus for performing a facial approximation is described. The system includes an acquisition subsystem and a facial approximation algorithm. The method includes the steps of acquiring models of known skulls and a model of a questioned skull, comparing the models of the known skulls with the model of the questioned skull, and removing variation in the facial structure of the questioned skull due to skeletal variation between the known skulls and the questioned skull. The apparatus includes a bony structure software component, a bony structure warping software component, and a soft tissue software component.

32 Claims, 11 Drawing Sheets

SYSTEM, APPARATUS AND METHOD FOR FORENSIC FACIAL APPROXIMATION

STATEMENT REGARDING GOVERNMENT INTERESTS

This invention was made with Government support under Contract No. J-FBI-02-101 awarded by the Department of Justice. The Government has certain rights in the invention.

BACKGROUND

The invention relates generally to a system, apparatus and method for forensically approximating facial characteristics, and more particularly to a computer-based system, apparatus and method for forensic facial approximation.

For more than one century, facial reconstruction has been used to recreate the appearance of a person's face based on a discovered skull. The field of facial reconstruction is divided into three main classes, namely facial restoration, superimposition, and facial approximation. Forensic facial restoration is used to create a lifelike representation of an unidentified individual whose face has been mutilated or decomposed, but for which much of the soft tissues and bone are available. Superimposition seeks to determine whether, given a photograph of an individual, a questioned skull is a sufficient match for the depicted face. The skull is overlaid with a transparency of the photograph, and anatomical landmarks on the skull and the photograph are compared to confirm or rule out a possible match.

Forensic facial approximation is the building of a three-dimensional model of the face from a skull or skull replica when there is no direct information about the original form of the face. Three-dimensional facial approximation can be traced back to the latter half of the nineteenth century. The earliest three-dimensional facial approximations were accomplished by measuring the thickness of the soft tissue at various positions on the faces of cadavers. Using the average of these values, a technique was developed for building a facial approximation on a skull. Several researchers have created general tissue depth tables. Further, tissue depth tables for various races have been created.

Researchers have more recently adapted facial approximation techniques to the computer. One researcher has developed a three-dimensional reconstruction system using a color laser scanner to digitize an unknown skull, a user interface to add average tissue depths, and a color laser scanner to digitize and add facial features.

Many of the computer-based approaches work directly on either volumetric or CT images or work from polygonal models derived from CT data or obtained directly from a range sensor.

Forensic facial reconstruction has two conflicting constraints. A reconstruction must contain sufficient detail for the face to be recognizable, but must not inject detail where detail does not exist.

SUMMARY

The present invention describes an apparatus, a system and a method for performing a three-dimensional forensic facial approximation for a skull of unknown identity.

One exemplary embodiment of the invention is a system for performing a forensic facial approximation. The system includes an acquisition subsystem for acquiring models of known skulls and of a questioned skull, and a facial approximation algorithm for comparing the models of the known skulls with the model of the questioned skull and for removing variation in the facial structure of the questioned skull due to skeletal variation between the known skulls and the questioned skull.

One aspect of the exemplary system embodiment is that the acquisition subsystem comprises at least one from the group consisting of a computed tomography machine, an MRI machine, an ultrasound machine, and a laser range finding apparatus, and that the models of the known skulls are superimposed upon the model of the questioned skull and warped to alter the shape of the known skulls to the shape of the questioned skull.

Another exemplary embodiment of the invention is a method for performing a forensic facial approximation. The method includes the steps of acquiring models of known skulls and a model of a questioned skull, comparing the models of the known skulls with the model of the questioned skull, and removing variation in the facial structure of the questioned skull due to skeletal variation between the known skulls and the questioned skull.

Another exemplary embodiment of the invention is a method for performing a facial approximation and tailoring the resultant approximation to specific assumed facial characteristics. The method includes the steps of comparing models of known skulls with a model of a questioned skull, superimposing the models of the known skulls upon the model of the questioned skull, warping the models of the known skulls to alter the shape of the known skulls to the shape of the questioned skull, and removing variation in the facial structure of the questioned skull due to skeletal variation between the known skulls and the questioned skull. The removing variation step includes superimposing models of known soft tissue upon the questioned skull and warping the models of the known soft tissue to provide the facial structure of the questioned skull.

Another exemplary embodiment of the invention is an apparatus for use in a computerized system for performing a forensic facial approximation. The apparatus includes a bony structure software component for comparing models of known skulls with a model of a questioned skull, a bony structure warping software component for removing variation between the bony structure of the questioned skull and the bony structure of the known skulls, and a soft tissue software component for warping models of soft tissue from the known skulls onto a model of a questioned skull.

These and other advantages and features will be more readily understood from the following detailed description of preferred embodiments of the invention that is provided in connection with the accompanying drawings.

DETAILED DESCRIPTION OF EXEMPLARY EMBODIMENTS

Figure 1:
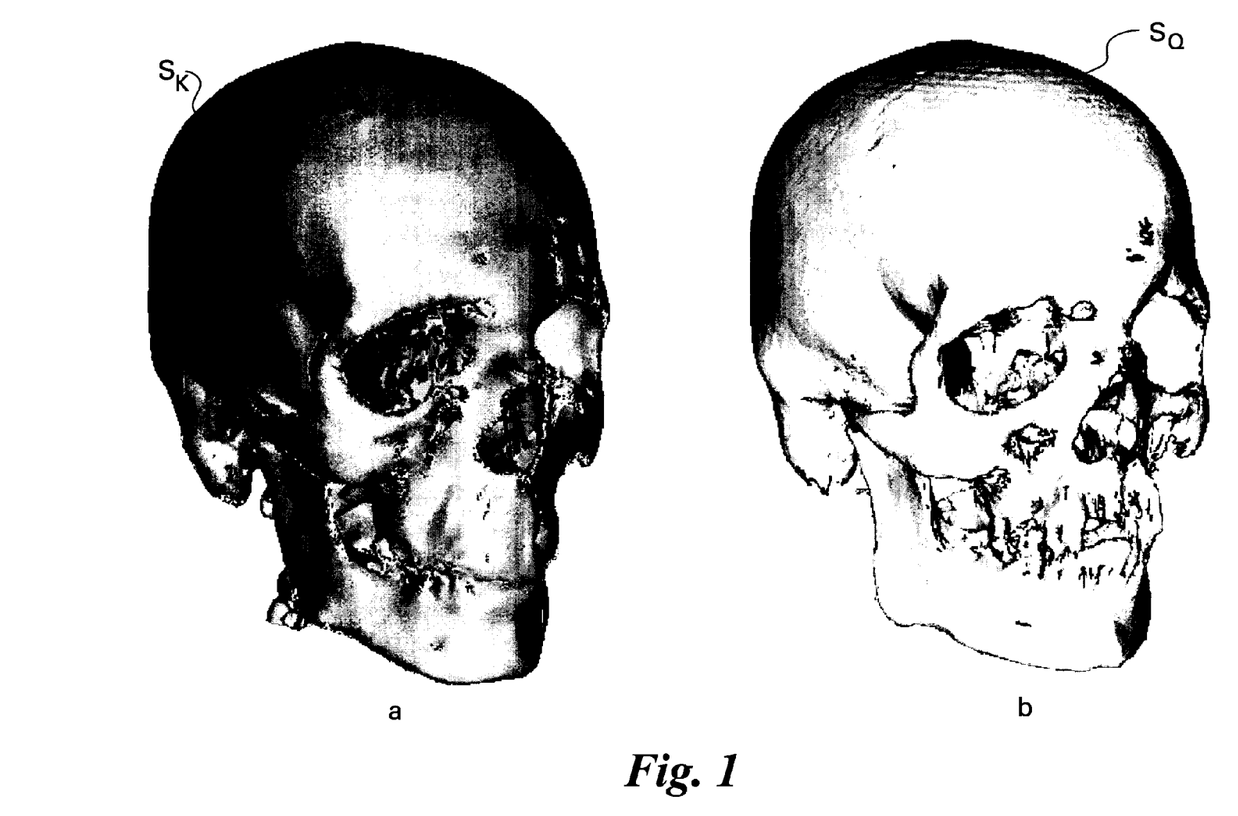
FIG. 1 is a perspective view of a known skull to be used to ascertain a forensic facial approximation for a questioned skull in accordance with an exemplary embodiment of the invention.

Embodiments of the invention, as described and illustrated herein, are directed to a system and a methodology for performing a forensic facial approximation on a questioned skull $S_Q$ (FIG. 1). The questioned skull $S_Q$ is a skull for which an identification is being sought. The questioned skull $S_Q$ is compared to a multitude of known skulls $S_K$, and characteristics of the known skulls $S_K$ are translated onto the questioned skull $S_Q$ to provide a mapping from the known skulls $S_K$ to the questioned skull $S_Q$. The mapping is then applied to the associated known faces $F_K$ to derive an average questioned face $F_Q$. Further, characteristics of the known faces $F_K$ of the known skulls $S_K$ obtained after mapping provide likely variations from the average questioned face $F_Q$.

Figure 2:
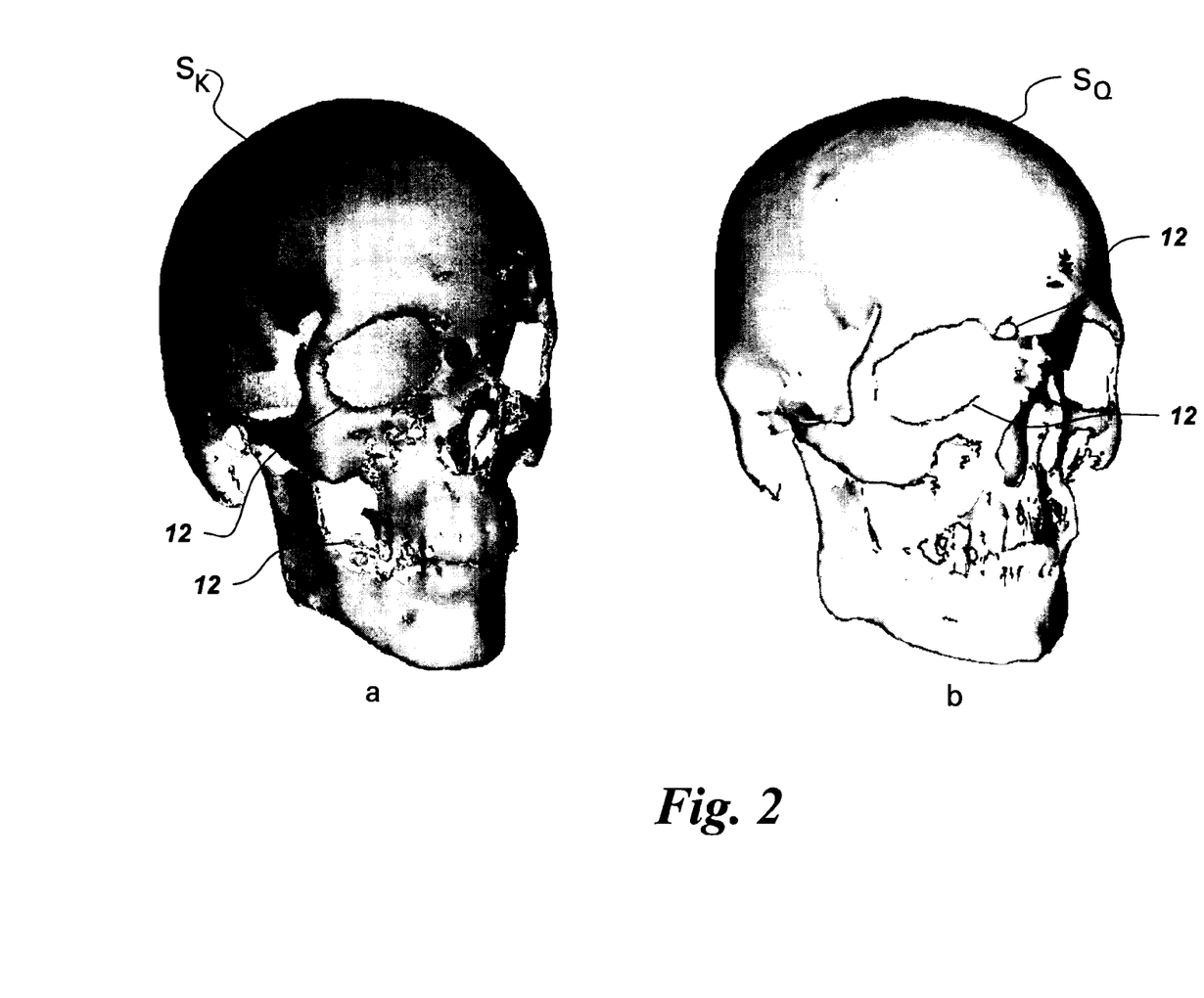
FIG. 2 is a perspective view of the known and questioned skulls of FIG. 1 including crest line approximations.
Figure 10:
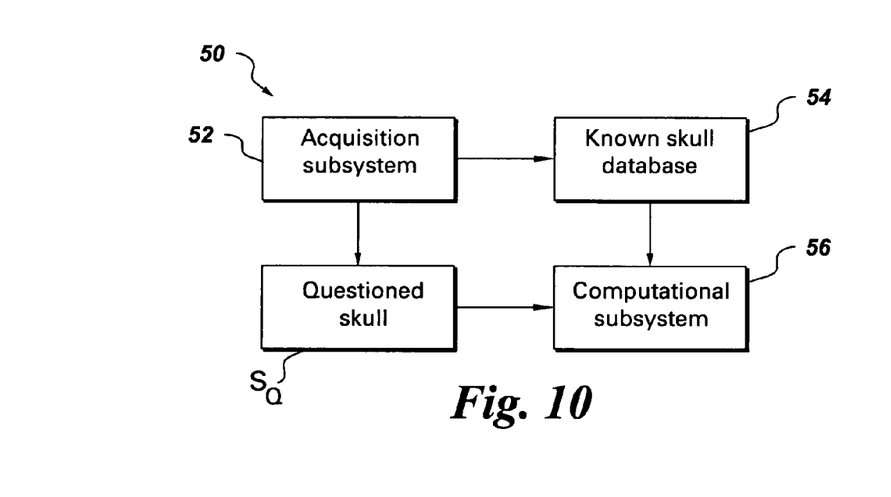
FIG. 10 illustrates a system for performing a forensic facial approximation in accordance with an exemplary embodiment of the invention.

FIG. 1 illustrates a visual three-dimensional representation of one known skull $S_K$ scaled to the size of a visual three-dimensional representation of a questioned skull $S_Q$. It should be appreciated that a database containing representations of known skulls $S_K$ may include as many as fifty, and possibly as many as one-hundred and fifty or more, separate such representations. FIG. 2 shows representations of the known skull $S_K$ and the questioned skull $S_Q$ with crest line approximations 12 superimposed thereon. Crest lines are the tops of ridges in a skull and represent lines about which the skull exhibits a high degree of curvature. The representations of the known and questioned skulls $S_K$ and $S_Q$ are obtained through the use of an acquisition subsystem 52 (FIG. 10). The acquisition subsystem 52 may include a computed tomography machine, an MRI machine, an ultrasound machine, a laser range finding apparatus, or other similar devices capable of acquiring data useful in facial reconstruction.

Figure 3:
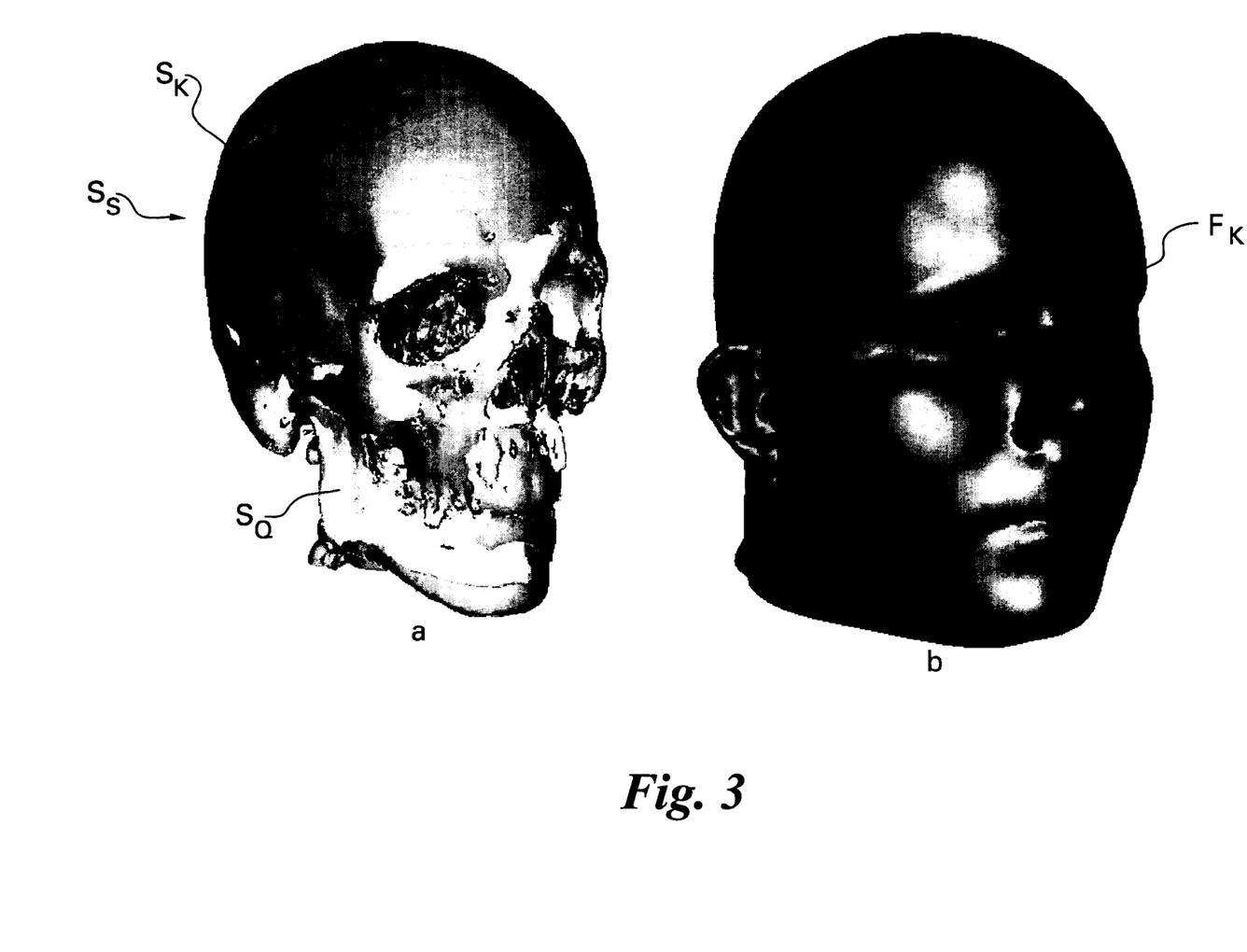
FIG. 3 is a perspective view of the questioned skull of FIG. 1 superimposed on the known skull of FIG. 1 and a known face.

With specific reference to FIGS. 3-9, next will be described the generation of a face-space 20 (FIG. 4) that contains a recognizable representation of the questioned face $F_Q$. For ease of illustration, FIGS. 3-9 illustrate the generation of a single input to the face-space 20. FIG. 3 illustrates the culmination of the preprocessing steps by showing the superimposition of skull $S_Q$ on skull $S_K$ to form a superimposed skull $S_S$. FIG. 3 also shows a preprocessed and un-deformed representation of the known face $F_K$. After the preprocessing steps, representations of the known and questioned skulls $S_K$, $S_Q$ are deformed, or warped, through a warping function $T_{(K,Q)}(\ )$. This warping function maps the known skull $S_K$ onto the questioned skull $S_Q$ as being approximately equal to $T_{(K,Q)}(S_K)$. The function for the questioned face $F_Q$ can be written as $F_Q = T_{(K,Q)}(F_K)$. Through these algorithms, known skulls $S_K$ are warped onto the questioned skull $S_Q$, and the same warping function is applied to known faces $F_K$, thereby causing warping of the known face $F_K$ onto the questioned skull $S_Q$ to generate a questioned face $F_Q$. These algorithms are designed to tolerate holes in the representational data (due to missing bony sections) in the questioned skull $S_Q$. The warping algorithm is designed to merge the surface of a known skull $S_K$ with the surface of a questioned skull $S_Q$, as shown in FIG. 3.

A portion of the algorithms relies upon finding and matching crest lines 12 or lines of maximal curvature on the skull. Such lines are formally calculated based on spatial derivatives of the skull surface. Approximate crest lines 12 may be determined by looking at the angle of intersection between a pair of triangular patches. If the angle of intersection is high, namely greater than a threshold of thirty degrees (30°), the line of intersection is considered a crest line 12.

Figure 4:
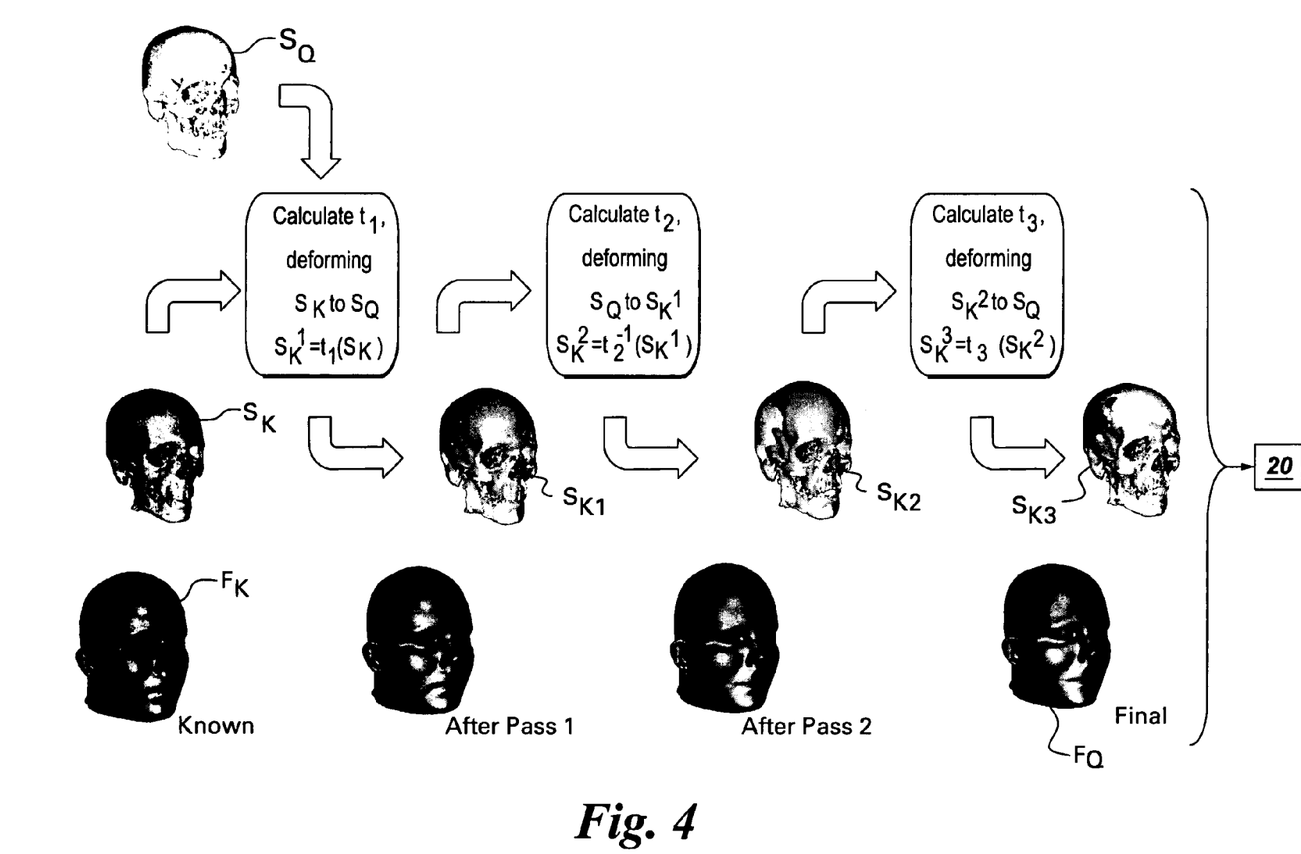
FIG. 4 illustrates three phases of transformation of the known skull into the questioned skull and the resulting third questioned face.

FIG. 4 schematically illustrates the face-space 20 in which the warping, through the warping algorithm, of known skulls $S_K$ into the questioned skull $S_Q$ forms a questioned face $F_Q$. The known skulls $S_K$ are obtained from a known skull database 54 (FIG. 10). The known skull database 54 is stocked with representations of known skulls $S_K$ that are substantially complete, meaning with no missing bony sections. The known skull database 54 preferably contains between fifty and one hundred and fifty known skulls $S_K$, although in principle the number of known skulls $S_K$ is unbounded. The individual passes shown in FIG. 4 are passes using variants of the same base algorithm. Each pass applies different inputs and parameter settings to bring specific parts of the skulls in alignment in the warping process. The first step provides rough alignment of skull features based on matching the crest lines 12 of the known skulls $S_K$ to those of the questioned skull $S_Q$. This step may be represented by the algorithm $S_K^1 = t_1(S_K)$, where $t_1$ represents the calculated deformation at the first pass. The second step is to more tightly align areas of high curvature. This step may be represented by the algorithm $S_K^2 = t_2^{-1}(S_K^1)$, where $t_2$ represents the calculated deformation at the second pass. The third step is to tightly align smooth areas away from the high curvature areas while maintaining the alignment of the high curvature areas. This step may be represented by the algorithm $S_K^3 = t_3(S_K^2)$, wherein $t_3$ represents the calculated deformation at the third pass. The output of each pass becomes one of the inputs to the next pass. The deformations $t_1$ and $t_3$ move the known skulls $S_K$ to the questioned skull $S_Q$. The deformation $t_2$ moves the questioned skull $S_Q$ onto the known skulls $S_K$, hence, the need for the inverse operator when calculating $S_K^2$.

The complete warping of the three passes can be represented by the algorithm $T_{(K,Q)}(S_K) = t_3(t_2^{-1}(t_1(S_K)))$. Each of the three passes has the same construction and includes removing outliers to aid robustness when registering to incomplete skulls. If, for example, an attempt is made to calculate a deformable transformation $t_i(\ )$ for pass i, such that $S_X$ is approximately $t_i(S_Y)$, outlier removal is accomplished by generating a rigid transform $r'_i(S_X)$. Such a transform is an iterative closest point (ICP) algorithm that finds points on two skulls that lie close to one another when the skulls are aligned. Given a source $S_X$ and a target $S_Y$, the ICP algorithm (a) selects a set $P_X$ of n points from $S_X$, (b) selects a set $P_Y$ of the n closest matching points from $S_Y$, (c) calculates the rigid transformation that minimizes the distance between the sets $P_X$ and $P_Y$, (d) applies the transform to $P_X$, and (e) starts over by finding a new set $P_Y$. The set $P_X$ is denoted as the source landmarks and the set $P_Y$ as the target landmarks of $r'_i()$.

The rigid transformation $r'_i()$ rigidly transforms the skulls in a direction opposite from the desired direction. Although this transformation ultimately is discarded, it serves to identify points $P_Y \in S_Y$ that are close to $S_X$. $S_Y$ is a polygonal surface including points, edges and surfaces, and $P_Y$ is a subset of the points. It can be reasonably ascertained that at any point $p_{yi} \in P_Y$ has a close corresponding point $P_{xj} \in S_X$. In other words, if a point is in the target landmarks of the initial rigid transformation, it can be assumed that the point is not an outlier, does not lie over a missing bony structure in the source skull, and must have a close correspondence to a source point.

A new ICP transform $r'_i()$ is then calculated based only on the reduced set of points, such that $S_X$ approximates $r'_i(P_Y)$. By limiting the source points from which $r'_i()$ can select, the members of $P_Y$ are limited to only valid correspondence points.

A final step is the calculation of a deformation $d_i$. This calculation treats the correspondences as lying in a deformable medium and pushes and pulls points in the source set until they lie close to the target set. Deformations propagate outward from the source points. Alignment between the source points and the corresponding target points is not absolute and a relaxation parameter σ allows the algorithm to trade off positional accuracy of the alignment with stresses induced by the deformation. The source landmarks of the second ICP registration, $r'_i(P_Y)$, are selected as the points to be deformed by a thin plate spline. The fixed points of the deformation are determined by searching the skull surface $S_X$ for the closest point on the skull surface with a surface normal orientation within a threshold of the surface normal at the corresponding point in $r'_i(P_Y)$. The full transformation, $t_i$, is then given as $t_i(X)=d_i(r'_i(X))$. As indicated in FIG. 4, the three passes calculate successively better approximations for $S_Q$ such that $S^3_K$ is a better approximation of $S_Q$ than $S^2_K$, which itself is a better approximation of $S_Q$ than $S^1_K$:

$$S^1_K = t_1(S_K)$$

$$S^2_K = t_2^{-1}(S^1_K), \text{ and}$$

$$S^3_K = t_3(S^2_K).$$

Figure 5:
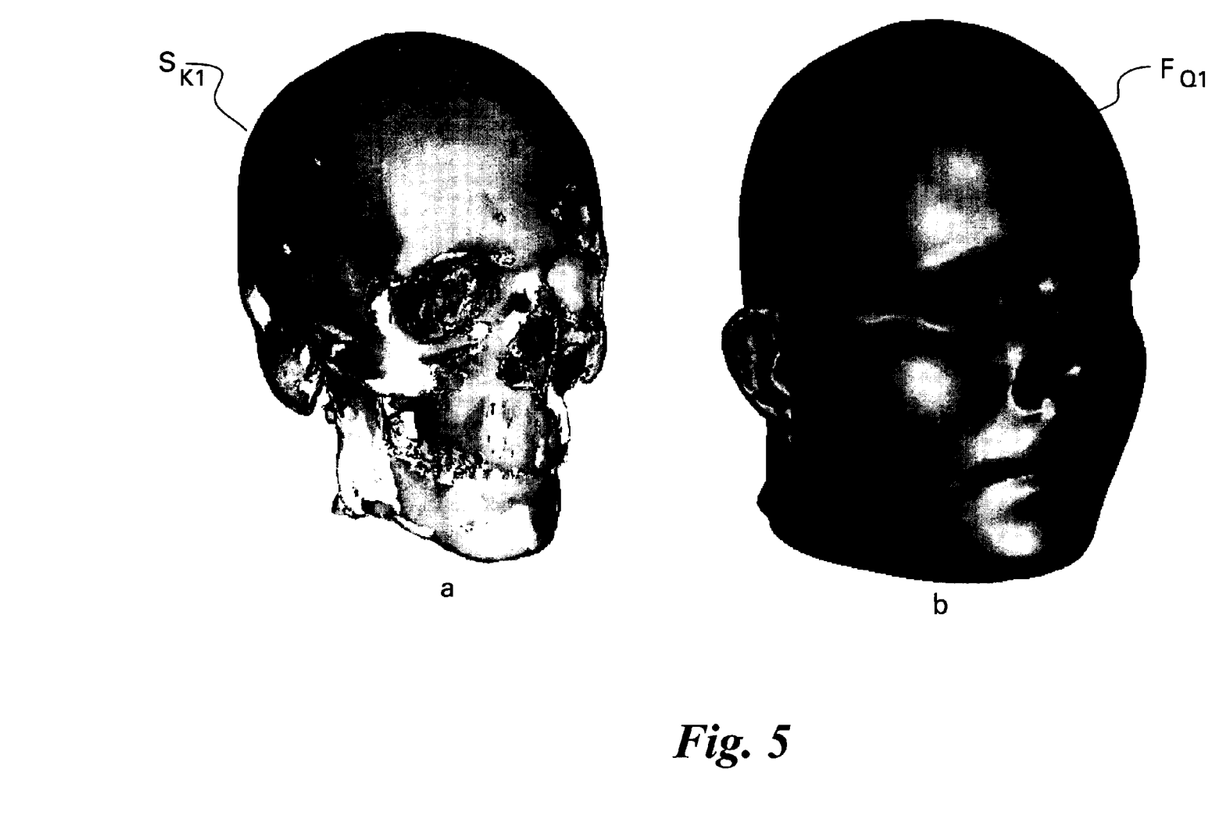
FIG. 5 is a perspective view of the first transformed known skull and the resulting first questioned face of FIG. 4.

Although the passes are conceptually the same, different inputs and different parameters are chosen to achieve desired results. For the first pass, the skull features are coarsely aligned. The selected points are limited to points on the crest lines 12 and $P_X$ and $P_Y$ are limited to roughly two hundred points each. The angle constraint between normals is fairly rigid, requiring source and target points for the deformation T to be within about eighteen degrees. The relaxation parameter σ is set at 10 to allow the thin plate spline more freedom to define smooth transformations. FIG. 5 shows a superimposition of the two skulls, denoted as $S_{K1}$, following the initial alignment pass. FIG. 5 further shows the associated facial deformation of the superimposed skull $S_{K1}$ as $F_{Q1}$. This first pass is designed to bring areas of high curvature on known skulls $S_K$ into alignment with corresponding areas on a questioned skull $S_Q$.

Figure 6:
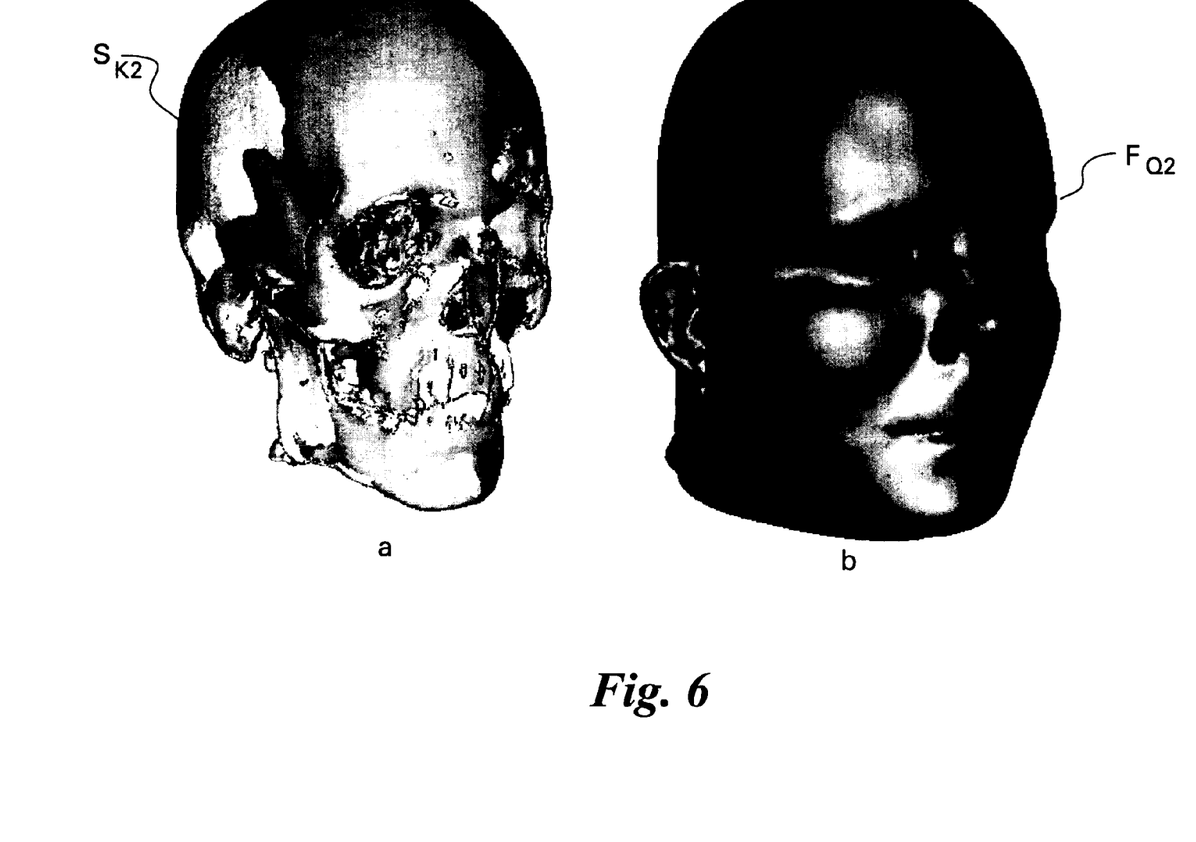
FIG. 6 is a perspective view of the second transformed known skull and the resulting second questioned face of FIG. 4.

The second pass is designed to work similarly to the first pass, except that the matching is from the questioned skull $S_Q$ to the known skulls $S_K$. The second pass attempts to reconcile skull areas where the first pass algorithm was unable to correctly differentiate between multiple candidate crest lines on the questioned skull $S_Q$. By running the same algorithm in the opposite direction on the same points, a higher likelihood is created that conflicts can be resolved. As with the first pass, the points available for registration are limited to those lying on crest lines of the skull. Unlike the first pass, the number of landmarks used in the registration is increased to the range of about 200-350. Since the second pass is a reverse of the first pass, the actual warping is such that $S^1_K$ approximates $t_2(S_K^2)$, and $S_K^2 = t_2^{-1}(S_K^1)$. The relaxation parameter σ is set at 1 and the deformation T is set at sixty degrees. FIG. 6 illustrates the skull alignment ($S_{K2}$) and corresponding facial deformation ($F_{Q2}$) following the completion of the second pass. As can be seen by a comparison of FIGS. 5 and 6, the major changes from the second pass are in the maxilla/front tooth region where the known skull and soft tissue are pulled in toward the questioned skull surface and in the frontal process region where the known skull and soft tissue are pulled out toward the questioned skull surface.

Finally, the third pass is intended to complete the skull deformation. An even larger number of landmarks, specifically divided up between the landmarks used in the second pass and an additional 200-500 landmarks chosen from the smooth skull surfaces, are used to ensure dense coverage of the skull. Stiffer splines force greater alignment between the correspondences chosen, and so the relaxation parameter σ is again set at 1 and the deformation T is again set at sixty degrees.

Figure 7:
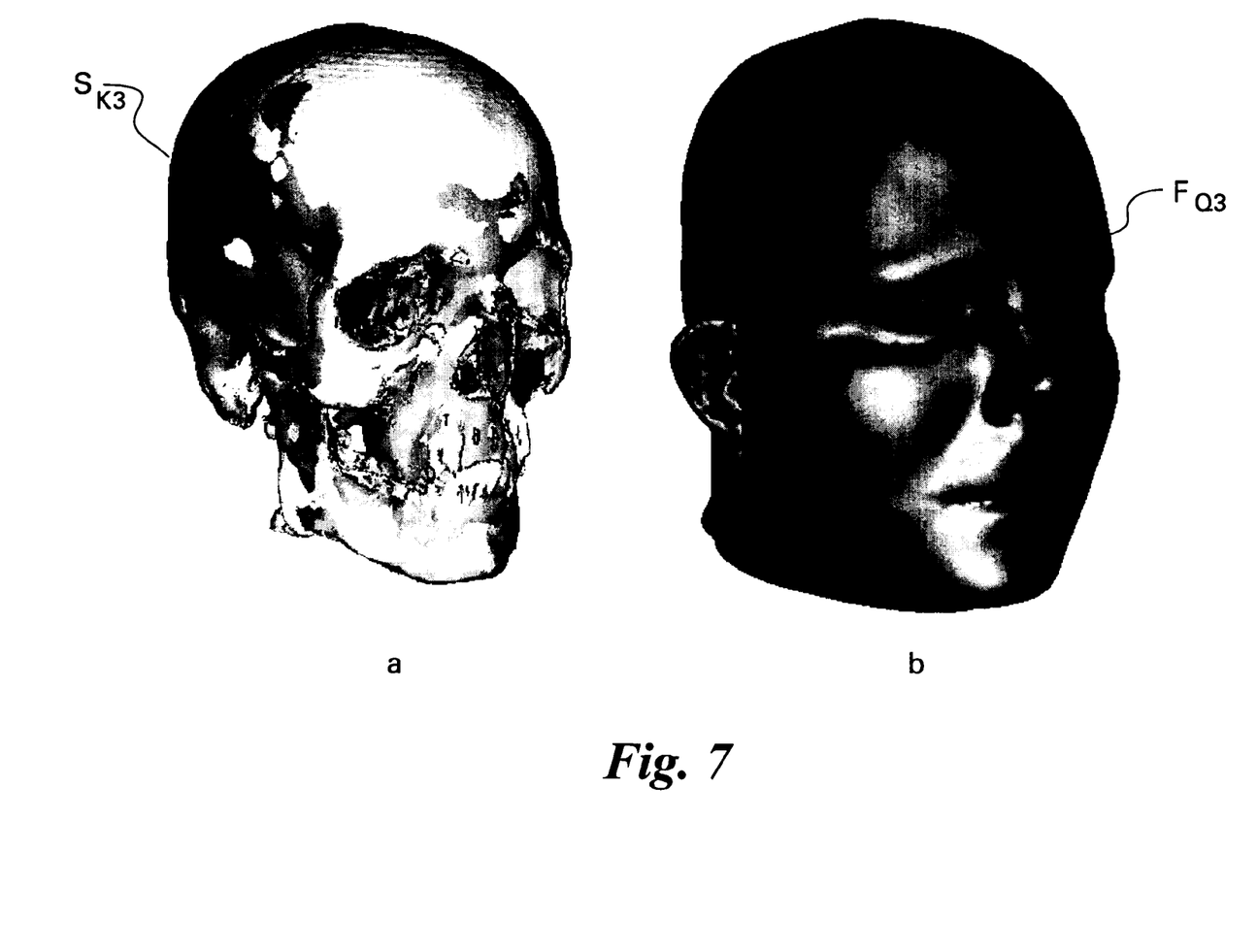
FIG. 7 is a perspective view of the third transformed known skull and the resulting third questioned face of FIG. 4.
Figure 8:
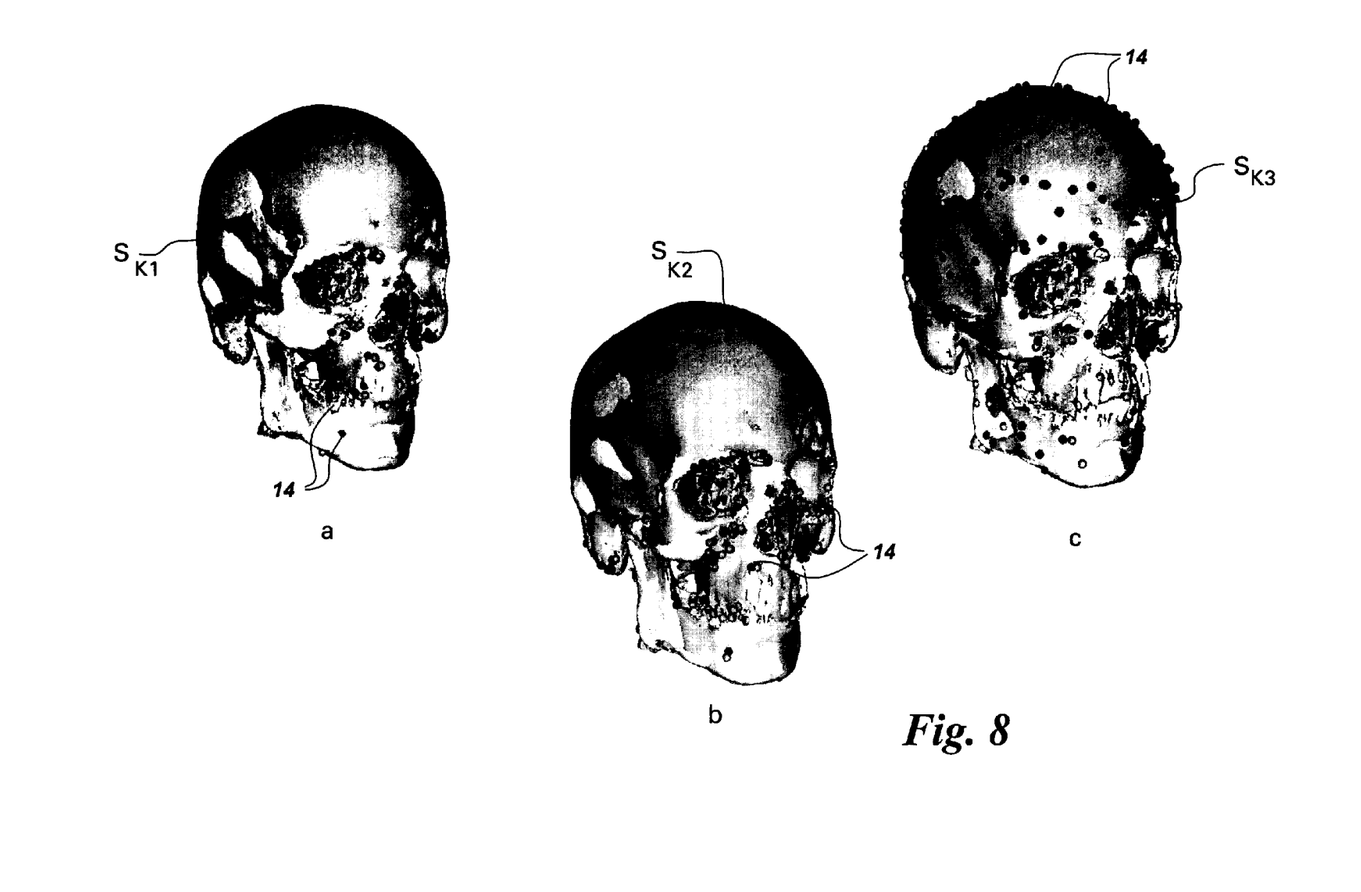
FIG. 8 is a perspective view of the first, second and third transformed known skulls of FIG. 4 shown with alignment points.

FIG. 7 illustrates the results of the third pass, showing the deformed known skull superimposed on the questioned skull ($S_{K3}$) and showing the corresponding deformed face ($F_{Q3}$). Most of the changes from the second pass occur in the flatter regions of the skulls. The mandible, frontal bone and anterior portions of the known skull have been moved into correspondence with the questioned skull. The soft tissue shows subtle changes such as a flattening of the crown, and a broader more pronounced cheek region.

Figure 9:
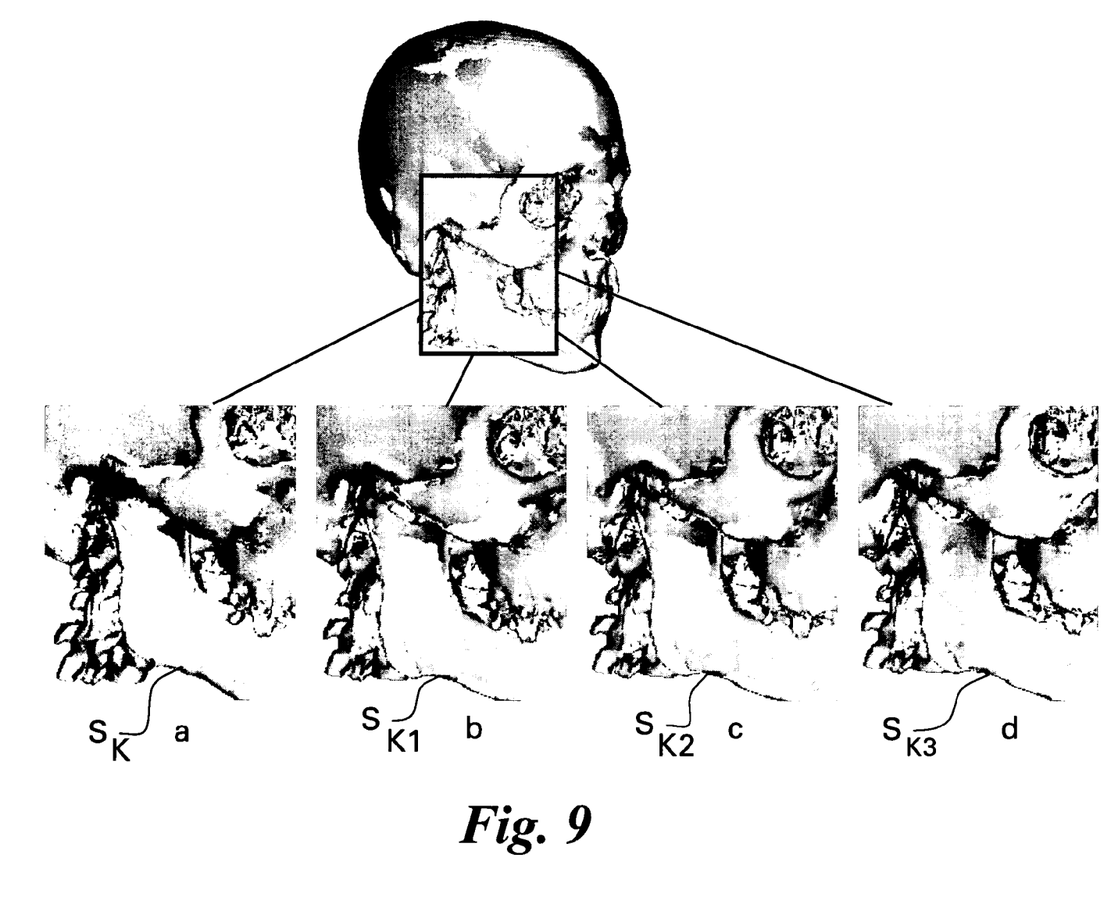
FIG. 9 illustrates close up views of a portion of the known skull of FIG. 1 and the first, second and third transformed known skulls of FIG. 4.

The ICP algorithm is used to align different instances of deformed skulls and used in the selection of landmarks for the thin plate spline deformation. The landmarks selected for the three passes are shown in, respectively, FIG. 8a, FIG. 8b, and FIG. 8c. As can be seen, the number of landmarks used increases from FIG. 8a (first pass) to FIG. 8c (third pass). As noted previously, all of the landmarks of FIG. 8b and FIG. 8c are used to calculate the third pass deformation. FIG. 9 illustrates a close up view of the right zygomatic process and ascending ramus of the mandible of the skulls following each step of the registration. Specifically, FIG. 9a shows the initial alignment, and FIGS. 9b-d respectively show the alignments following each of the three passes.

Figure 11:
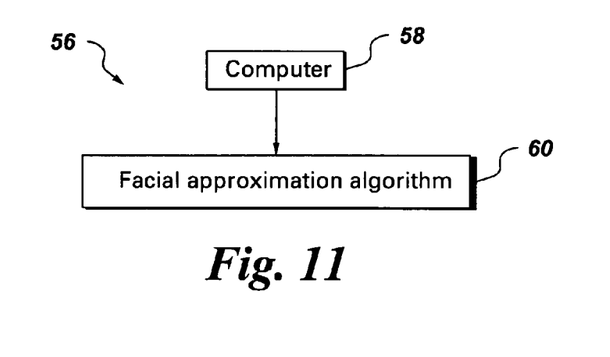
FIG. 11 further illustrates the computational subsystem of FIG. 10.

FIG. 10 illustrates a forensic facial approximation system 50 for use in the above-described methodology. The illustrated system 50 includes an acquisition subsystem 52, a known skull database 54, and a computational subsystem 56. The questioned skull $S_Q$ is input into the system 50 so that the questioned skull can be compared against the skull representations in the known skull database 54. The warping between the questioned skull $S_Q$ and the representations of the known skulls $S_K$ from the known skull database 54 is accomplished by the computational subsystem 56. Specifically, and as further illustrated in FIG. 11, the computational subsystem 56 includes a computer 58, or other suitable computing device, and one or more facial approximation algorithms 60. The computational subsystem 56 may include a bony structure software component for comparing models of known skulls with a model of a questioned skull. Further, the computational subsystem 56 may include a bony structure warping software component for removing variation between the bony structure of the questioned skull and the bony structure of the known skulls and a soft tissue software component for warping models of soft tissue from the known skulls onto a model of a questioned skull.

Figure 12:
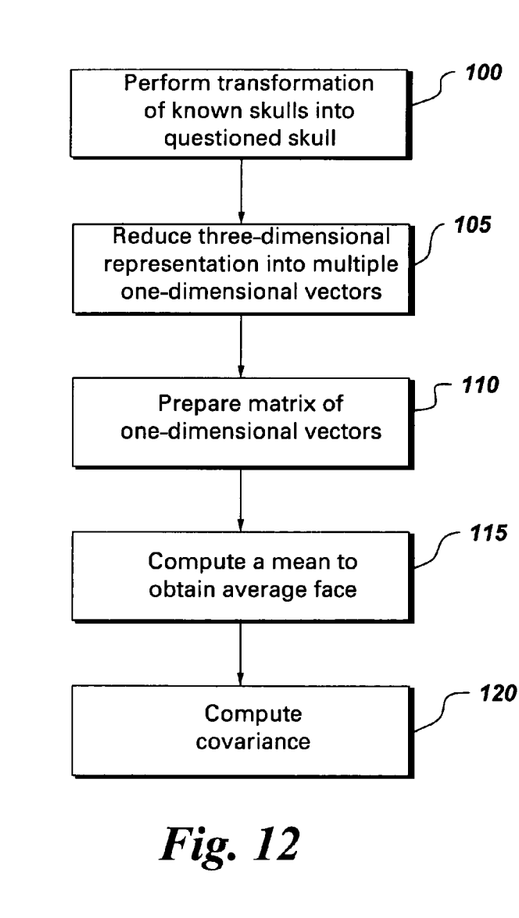
FIG. 12 illustrates process steps for performing a forensic facial approximation in accordance with an exemplary embodiment of the invention.

Referring with specific reference to FIG. 12, next will be described a method for performing a forensic facial approximation between a questioned skull $S_Q$ and a database of known skull representations $S_K$. At Step 100, a transformation of the known skulls $S_K$ from the known skull database 54 into the questioned skull $S_Q$ is performed. The transformation is accomplished through warping of variations. Step 100 represents the three passes described above with reference to FIGS. 8(a), 8(b), and 8(c). At Step 105, each three-dimensional skull representation $S_K^3$ is reduced into a one-dimensional vector. A matrix of the one-dimensional vectors is prepared at Step 110. A mean of the matrix is computed to obtain an average face at Step 115.

Finally, at Step 120, a covariance is computed. The covariance may be computed through a standard mathematical technique, namely a principle component analysis (PCA). The PCA utilizes the concept that eigenvectors vary most along the line of the greatest eigenvalue, thus allowing one using PCA to determine how data varies together. Specifically, using PCA allows one to denote that the change in one part of the model concurrently causes changes in other parts of the model. Thus, instead of independently adjusting each point comprising the representation of the approximated face, one can utilize PCA and ascertain how deformation occurs more naturally through the population of the faces of the known skull database 54 after warping. It should also be appreciated that, with any particular questioned skull $S_Q$, one may have additional information that can be used to prevent the change of any particular voxel based upon other voxel changes. For example, one may have heuristic or a priori data regarding the position of the tip of the nose of the questioned skull $S_Q$ relative to the face. That data allows certain data in the face space to become static, or to only change a small amount.

The system and method described thus far encodes the face and skull as a matrix of radial distance measurements outward from a central axis. Following the generation of the faces $F_Q$, this depth-based encoding forms the basis for the input to the PCA and subsequent generation of the face-space 20. This is only one of the possible encodings of the faces $F_Q$. As an alternative to using depth, feature points, such as, for example, the tip of the nose or corner of the eye, can be marked and tracked through the warping of the known faces $F_K$ into the faces $F_Q$. A linearization of the three-dimensional coordinates of these points, augmented by additional points on the face determined from them, can form the basis for the PCA analysis and generation of the face-space 20, separate from that derived from the depth-based encoding.

Figure 13:
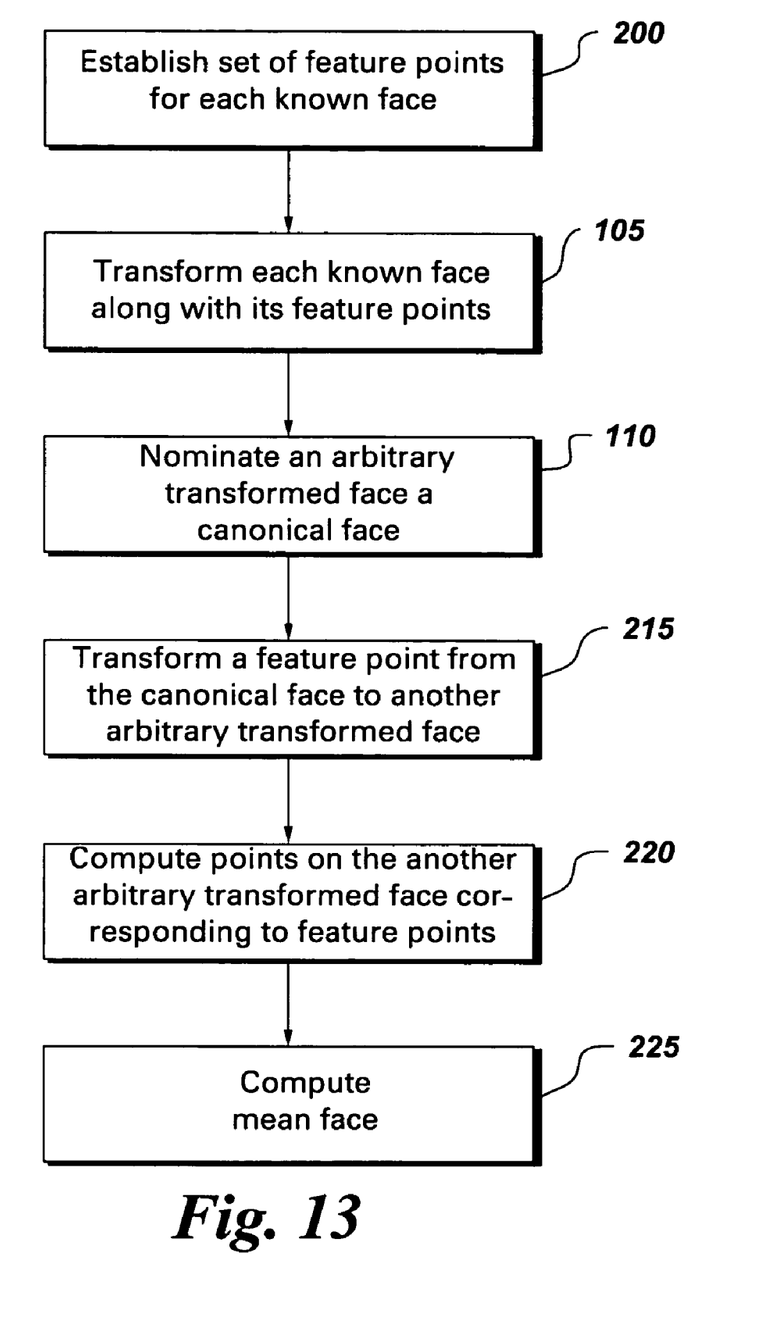
FIG. 13 illustrates process steps for performing a feature-based reconstruction in accordance with an exemplary embodiment of the invention.

FIG. 13 illustrates process steps for feature-based reconstruction. At Step 200, a set of feature points is established for each known face $F_K$. Each of these feature points will be salient, such as the region around the lips and the eyes, or the tip of the nose. Each feature point can be designated FP_i, where i indexes into the database. Next, at Step 205, each known face $F_K$ is transformed along with its feature points. The transformation is via the known to questioned skull transformation described above. Each face F_i becomes F_i, and each set of transformed points are now defined as fp'_i.

At Step 210, one arbitrary transformed face is nominated to be a canonical face F'_c. The feature points for the canonical face F'_c are fp'_c. Then, a warping function wf_i( ) is defined such that the feature points fp'_c on the canonical face F'_c are transformed into the feature points for the i'th warped face F'_i at Step 215. The warping function wf_i( ) is defined based upon the relationship between the canonical face feature points fp'_c and the i'th warped face feature points fp'_i. Preferably, the warping function wf_i( ) is a basic thin plate spline transform. This second warping stage aligns the features of each face F'_I with that of the canonical face F'_c, allowing arbitrary points on the canonical face to be put in to correspondence with points on each of the faces F'_i.

At Step 220, a new set N of points, f"p_c, are selected from the canonical face F'_c. Ideally, f"p_c contains those points f'p_c with additional points specified manually to highlight areas of concern, and/or selected randomly by the computer software. Correspondences between the points f"p_c and points on the faces F'_I are calculated as f"p_i. This is accomplished by transforming the feature points fp'_c as well as its normal, and then intersecting the normal with the transformed surface. The set of points f"p_I are linearized by their (x, y, z) coordinates and the resulting vectors composited into a matrix M of the one-dimensional vectors as described with reference to Step 110. Processing of the matrix M proceeds on as described previously. There are N feature points on the canonical face and L samples in the database. Next, at Step 225, the mean face is computed using the equation $C=(M-\text{mean})(M-\text{mean})^T$. Further, E is computed such that CE+E (Lambda).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A system for performing a forensic facial approximation, comprising:
   an acquisition subsystem for acquiring models of known skulls and a model of a questioned skull;
   a computational subsystem comprising a facial approximation algorithm that removes variation between the known skulls and the questioned skull, represents a three-dimensional soft tissue depth as multiple one-dimensional vectors, and analyzes the multiple one-dimensional vectors using principle component analysis resulting in a spectrum of low dimensional parameterized reconstructions.

2. The system of claim 1, wherein the models of the known skulls are superimposed upon the model of the questioned skull and warped to alter the shape of the known skulls to the shape of the questioned skull.

3. The system of claim 2, further comprising a database for housing the models of the known skulls.

4. The system of claim 2, wherein models of known soft tissue are superimposed upon the questioned skull and warped to provide the facial structure of the questioned skull.

5. The system of claim 4, further comprising a database for housing the models of the known soft tissue.

6. The system of claim 1, wherein the acquisition subsystem comprises a computed tomography machine.

7. The system of claim 1, wherein the acquisition subsystem comprises an MRI machine.

8. The system of claim 1, wherein the acquisition subsystem comprises an ultrasound machine.

9. The system of claim 1, wherein the acquisition subsystem comprises a laser range finding apparatus.

10. A system for performing a forensic facial approximation, comprising:
an acquisition subsystem for acquiring models of known skulls and a model of a questioned skull wherein the acquisition subsystem comprises at least one from the group consisting of a computed tomography machine, an MRI machine, an ultrasound machine, and a laser range finding apparatus; and
a computational subsystem comprising a facial approximation algorithm that removes variation between the known skulls and the questioned skull, represents a three-dimensional soft tissue depth as multiple one-dimensional vectors, analyzes the multiple one-dimensional vectors using principle component analysis resulting in a spectrum of low dimensional parameterized reconstructions, superimposes the known skulls upon the questioned skull and warps to alter the shape of the known skulls to the shape of the questioned skull.

11. The system of claim 10, further comprising a database for housing the models of the known skulls.

12. The system of claim 10, wherein models of known soft tissue are superimposed upon the questioned skull and warped to provide the facial structure of the questioned skull.

13. The system of claim 12, further comprising a database for housing the models of the known soft tissue.

14. A method for performing a forensic facial approximation, comprising:
acquiring models of known skulls and a model of a questioned skull;
comparing the models of the known skulls with the models of the questioned skull;
removing variation between the known skulls and the questioned skull;
representing a three-dimensional soft tissue depth as multiple one-dimensional vectors;
analyzing the multiple one-dimensional vectors using principle component analysis resulting in a spectrum of low dimensional parameterized reconstructions; and
capturing remaining soft tissue variation via principle component analysis to generate a range of possible facial approximations.

15. The method of claim 14, further comprising:
superimposing the models of the known skulls upon the model of the questioned skull; and
warping the models of the known skulls to alter the shape of the known skulls to the shape of the questioned skull.

16. The method of claim 15, further comprising:
superimposing models of known soft tissue upon the questioned skull; and
warping the models of the known soft tissue to provide the facial structure of the questioned skull.

17. The method of claim 14, wherein said acquiring step comprises acquiring models with a computed tomography machine.

18. The method of claim 14, wherein said acquiring step comprises acquiring models with an MRI machine.

19. The method of claim 14, wherein said acquiring step comprises acquiring models with an ultrasound machine.

20. The method of claim 14, wherein said acquiring step comprises acquiring models with a laser range finding apparatus.

21. The method of claim 14, wherein the forensic facial approximation is based upon depth of tissue from a central axis.

22. The method of claim 14, wherein the forensic facial approximation is feature-based.

23. The method of claim 22, wherein each of a set of known faces having feature points is warped.

24. The method of claim 23, wherein feature points from one known face are warped onto the other known faces.

25. A method for performing a facial approximation and tailoring the resultant approximation to specific assumed facial characteristics, comprising:
comparing models of known skulls with a model of a questioned skull;
superimposing the models of the known skulls upon the model of the questioned skull;
warping the models of the known skulls to alter the shape of the known skulls to the shape of the questioned skull; and
removing variation between the known skulls and the questioned skull, wherein said removing variation step comprises:
representing a three-dimensional soft tissue depth as multiple one-dimensional vectors;
analyzing the multiple one-dimensional vectors using principle component analysis resulting in a spectrum of low dimensional parameterized reconstructions;
superimposing models of known soft tissue upon the questioned skull; and
warping the models of the known soft tissue to provide a basis for a principle component analysis to approximate the facial structure of the questioned skull.

26. The method of claim 25, further comprising acquiring models with a computed tomography machine.

27. The method of claim 25, further comprising acquiring models with an MRI machine.

28. The method of claim 25, further comprising acquiring models with an ultrasound machine.

29. The method of claim 25, further comprising acquiring models with a laser range finding apparatus.

30. A computerized system for performing a forensic facial approximation, comprising:
a computational element configured with:
a bony structure software component for comparing models of known skulls with a model of a questioned skull;
a bony structure warping software component for removing variation between the questioned skull and the known skulls, representing a three-dimensional soft tissue depth as multiple one-dimensional vectors and analyzing the multiple one-dimensional vectors using principle component analysis resulting in a spectrum of low dimensional parameterized reconstructions; and
a soft tissue software component for warping models of soft tissue from the known skulls onto a model of a questioned skull, said warped model of soft tissue providing a basis for principle component analysis facial approximation.

31. The apparatus of claim 30, wherein the soft tissue software component warps models of soft tissue based upon determined depths of tissue.

32. The apparatus of claim 30, wherein the soft tissue software component warps models of soft tissue based upon facial feature points.

* * * * *